United States Patent [19]
Myers

[11] 3,831,997
[45] Aug. 27, 1974

[54] CONTROLLED COLLAPSE VEHICLE FRONT END STRUCTURE

[75] Inventor: Robert A. Myers, Garden City, Mich.

[73] Assignee: Ford Motor Company, Dearborn, Mich.

[22] Filed: Mar. 22, 1973

[21] Appl. No.: 343,744

[52] U.S. Cl............... 296/28 R, 188/1 C, 213/1 A, 267/139, 280/106 R, 293/63, 293/70, 188/1 C
[51] Int. Cl............................................ B62d 25/00
[58] Field of Search............... 296/28 R; 280/106 R; 293/1, 63, 64, 70; 267/139; 213/1 A

[56] References Cited
UNITED STATES PATENTS

| | | | |
|---|---|---|---|
| 3,307,868 | 3/1967 | Blank............................... | 188/1 C X |
| 3,412,628 | 11/1968 | DeGain........................... | 188/1 C X |
| 3,508,633 | 4/1970 | Nishimura et al................. | 188/1 C |
| 3,610,609 | 10/1971 | Sobel.............................. | 188/1 C X |
| 3,671,068 | 6/1972 | Gerhard.......................... | 293/1 |
| 3,718,364 | 2/1973 | Fischer et al. .................. | 296/28 R |

FOREIGN PATENTS OR APPLICATIONS

| | | | |
|---|---|---|---|
| 1,405,867 | 1/1969 | Germany.......................... | 296/28 R |
| 707,956 | 6/1966 | Italy................................ | 296/28 R |

Primary Examiner—Robert J. Spar
Assistant Examiner—Leslie J. Paperner
Attorney, Agent, or Firm—Keith L. Zerschling; John J. Roethel

[57] ABSTRACT

A controlled collapse vehicle front end structure comprising a laterally corrugated loop means extending from the front end of the vehicle frame structure toward the dash panel. Upon a high speed frontal impact, the corrugations fold flat upon themselves providing longitudinal deformation with a constant load rate.

4 Claims, 2 Drawing Figures

PATENTED AUG 27 1974

3,831,997

CONTROLLED COLLAPSE VEHICLE FRONT END STRUCTURE

BACKGROUND OF THE INVENTION

One of the objectives of federally sponsored vehicle safety programs has been the development of a vehicle capable of impacting a crash barrier at 50 mph with minimum injury to the vehicle occupants. The dissipation of the kinetic energy generated during a 50 mph barrier crash requires an energy absorbing or energy management system adapted to make use of the available crush space forward of the passenger compartment while keeping the passenger compartment deceleration as low as possible. According to one theory, the basic elements of such an energy management system are an energy absorbing bumper system, a crushable frame and a controlled collapse fender apron structure. It has been further theorized that the front frame and bumper system should absorb 65 percent of the kinetic energy with the remaining 35 percent of the energy absorption to be achieved in the body front end.

It is an object of the present invention to provide a fender apron structure capable upon frontal impact of achieving energy absorbing longitudinal deformation with a controlled load rate.

SUMMARY OF THE INVENTION

The present invention relates to a controlled collapse front end structure for a vehicle having a forward compartment defined by a dash panel extending laterally of the vehicle and by rail members extending longitudinally forwardly of the dash panel. The rail members are connected forwardly of the dash panel by a laterally extending cross member. The improvement comprises a corrugated means extending from the front end of the rail members toward the vehicle dash panel. The corrugated means is formed as a closed loop having its longitudinal axis paralleling the longitudinal rail members. The corrugations of the corrugated means are constructed and arranged to fold flat upon themselves upon frontal impact to provide energy absorbing longitudinal deformation with a controlled load rate.

BRIEF DESCRIPTION OF THE DRAWING

Further features and advantages of the present invention will be made more apparent as this description proceeds, reference being had to the accompanying drawings, wherein.

DETAILED DESCRIPTION OF THE INVENTION

Figure 1:
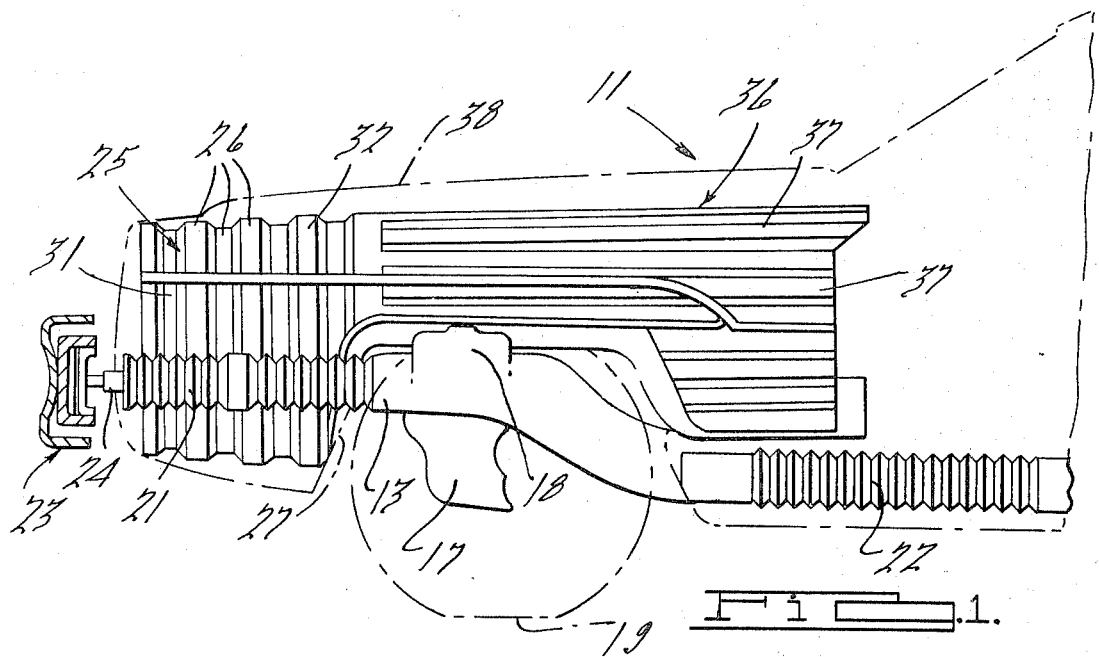
FIG. 1 is a side elevational view in part sectional of the front end of a vehicle constructed in accordance with the present invention.
Figure 2:
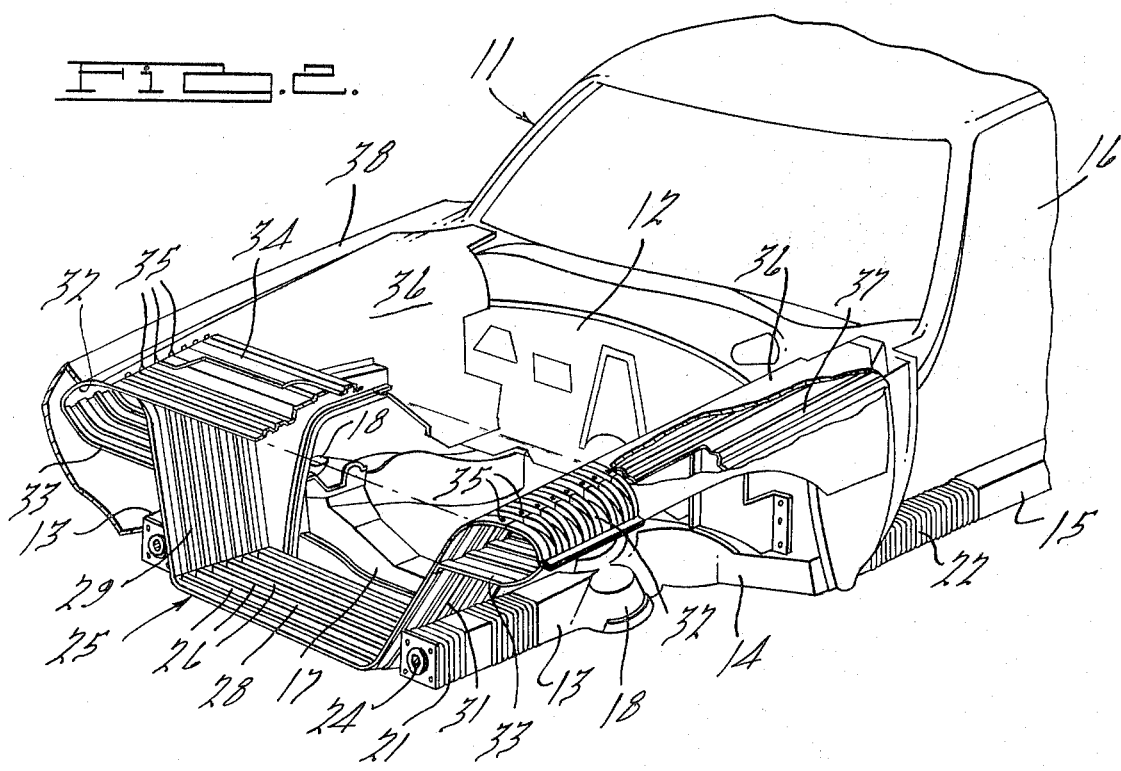
FIG. 2 is a perspective view of the vehicle front end with parts cut away and in section to reveal the details of construction.

Referring now to the drawing, there is illustrated a front portion of a vehicle body, generally designated 11. This front portion of the vehicle body 11 is that generally utilized as the engine compartment. The engine compartment is defined at its rear by a vertical cowl or dash panel 12 and by forwardly longitudinally extending rail members 13 joined by torque box structure 14 to the side rails 15 supporting the portion of the body shell 16 comprising the passenger compartment area.

The forwardly extending rail members 13 are connected or cross braced by a cross member 17. The cross member 17 is cradle-shaped intermediate its ends to receive the vehicle engine and has spring towers or pockets 18 at each end to receive components of the road wheel 19 suspension system.

Each of the forward side rails 13 and the body 11 related rails 15 are box-shaped in cross section and is partially formed of corrugated sheet metal sections 21 and 22, respectively. These sections are constructed to collapse or crush at a controlled rate when subjected to an impact load that exceeds a predetermined minimum value.

The bumper system 23 shown in FIG. 1 comprises a pair of telescopic shock absorbers 24, only one of which is visible. The shock absorber 24 is housed in a support tube (not visible) disposed within the energy absorbing frame section 21.

The energy absorbing bumper system and the crushable frame sections comprise basic elements of an energy management or energy absorbing system for a motor vehicle.

The present invention adds another basic element, a controlled collapse front end or a fender apron structure, generally designated 25. It will be understood that the controlled collapse front end structure will have utility independently of the above-described energy absorbing bumper system and the crushable frame sections.

The controlled collapse front end or fender apron structure 25 comprises a corrugated sheet metal means or structure extending from the front end of the rail members 13 toward the vehicle dash panel 12. The corrugated sheet metal structure is formed as a loop having its longitudinal axis paralleling the rail members 13. The corrugations 26 are constructed and arranged to telescope and fold flat upon themselves upon frontal impact to provide energy absorbing longitudinal deformation with a controlled load rate.

As shown in the drawing, the corrugated metal structure 25 terminates forwardly of the laterally extending cross member 17 or substantially in alignment with the forward edge 27 of the wheel well.

More specifically, the corrugated sheet metal structure 25 comprises a substantially horizontal corrugated panel 28 extending between the rail members 13. Integral with or welded to the side edges of the horizontal panel 28 are corrugated side panels 29–31. Each side panel 29–31 extends from its lower end or edge upwardly at an outwardly inclined angle so that it overlies the respective rail section 13.

Each outwardly inclined side panel 29–31 terminates in a substantially elliptical half or semi-cylindrical shell 32 with the open face facing downwardly. The open face or bottom of each half-shell is closed by a corrugated panel section 33.

The main loop is completed or closed by a corrugated top section or panel 34 which is preferably held by bolts 35 to the tops of the respective half shells 32. The fender apron structure rearwardly of the loop structure 25 may comprise panels 36 having longitudinal extending reinforcing ribs 37. It will be understood that the fender aprons will be concealed from the outside of the vehicle by the front quarter panels or fenders 38.

Upon a frontal impact such as is obtained by crashing a vehicle into a crash barrier at a speed of 50 mph, the body front end structure embodying the corrugated sheet metal structure 25 of the present invention is projected to absorb 35 percent of the kinetic energy of the impact while the bumper and frame system will absorb the remaining 65 percent. It is further projected that the vehicle crush deformation will be approximately 36 inches with a maximum deceleration of the passenger compartment in the neighborhood of 32G's with the passenger compartment coming to a rest position at less than 85 milliseconds.

It is to be understood that the invention is not limited to the exact construction illustrated and described above, but that various changes and modifications may be made without departing from the spirit and scope of the invention defined by the following claims.

I claim:

1. A controlled collapse front end structure for a vehicle having a forward compartment defined by a dash panel extending laterally of the vehicle and by rail members extending longitudinally forwardly of the dash panel, the rail members being connected forwardly of the dash panel by a laterally extending cross member, wherein the improvement comprises:
a corrugated means extending from the front end of the longitudinal rail members toward the vehicle dash panel,
the corrugated means being formed as a closed loop having its longitudinal axis paralleling the rail members,
the corrugated means terminating forwardly of the laterally extending cross member,
the corrugated means comprising a substantially horizontal lower panel extending between the rail members,
side panels extending from the lower panel upwardly and outwardly over the rail members,
and an upper horizontal panel having its lateral ends attached to the upper ends of the side panels,
the corrugations of the corrugated means being constructed and arranged to fold flat upon themselves upon frontal impact to provide energy absorbing longitudinal deformation with a controlled load rate.

2. A controlled collapse front end structure according to claim 1, in which:
the inclined side panels terminate in substantially elliptical half-shell sections facing downwardly,
the half-shells being closed across the bottom by panel sections,
and the upper horizontal panel is removably secured at each end to the upper surface of respective half-shell sections.

3. A controlled collapse front end structure for a vehicle having a forward compartment defined by a dash panel extending laterally of the vehicle and by rail members extending longitudinally forwardly of the dash panel, the rail members being connected forwardly of the dash panel by a laterally extending cross member, wherein the improvement comprises:
a corrugated fender apron structure extending from the front end of the longitudinal rail members toward the vehicle dash panel,
the corrugated fender apron structure being formed as a closed loop having its longitudinal axis paralleling the rail members,
the corrugated fender apron structure comprises a substantially horizontal lower panel extending between the rail members,
side panels extending from the lower panel upwardly and outwardly over the rail members,
and an upper horizontal panel having its lateral ends attached to the upper ends of the side panels,
the corrugations of the corrugated fender apron structure being constructed and arranged to fold flat upon themselves upon frontal impact to provide energy absorbing longitudinal deformation with a controlled load rate.

4. A controlled collapse front end structure according to claim 3, in which:
the inclined side panels terminate in substantially elliptical half-shell sections facing downwardly,
the half-shells being closed across the bottom by panel sections,
and the upper horizontal panel is removably secured at each end to the upper surface of a respective half-shell section.

* * * * *